United States Patent [19]

Mills

[11] Patent Number: 4,490,967

[45] Date of Patent: Jan. 1, 1985

[54] APPARATUS FOR LIFTING CROPS

[76] Inventor: Delbert L. Mills, 1713 Sandalwood Dr., Norman, Okla. 73071

[21] Appl. No.: 481,826

[22] Filed: Apr. 4, 1983

[51] Int. Cl.³ ............................................. A01D 55/28
[52] U.S. Cl. ........................................ 56/312; 56/119
[58] Field of Search .................... 56/119, 312–314, 56/318–320

[56] References Cited

U.S. PATENT DOCUMENTS

| | | | |
|---|---|---|---|
| 1,936,006 | 11/1933 | Braden | 56/312 |
| 2,576,122 | 11/1951 | Kenison | 56/312 |
| 2,702,980 | 3/1955 | Pitner | 56/312 |
| 2,707,365 | 5/1955 | Dreher | 56/312 |
| 2,734,332 | 2/1956 | Fisher | 56/314 |
| 2,892,298 | 6/1959 | Chaney | 56/314 |
| 2,960,814 | 11/1960 | Babcock | 56/312 |
| 2,970,420 | 2/1961 | Schmidt | 56/119 |
| 3,335,554 | 8/1967 | Gricknik | 56/119 |
| 3,821,877 | 7/1974 | Weinheimer | 56/312 |
| 4,022,000 | 5/1977 | Coxbill | 56/312 |

FOREIGN PATENT DOCUMENTS 69700 10/1945 Norway .............................. 56/318

Primary Examiner—Paul J. Hirsch
Attorney, Agent, or Firm—Laney, Dougherty, Hessin & Beavers

[57] ABSTRACT

An apparatus for lifting crops ahead of a harvesting machine which includes a mounting bracket and a pick-up bar pivotally connected by a linkage, and a guide frame for guiding the rear portion of the pick-up bar so that as the pick-up bar swings backward in relation to said mounting bracket, a front end portion of the pick-up bar is lifted. An alternate linkage adjustable in length is also disclosed. An adjustable abutment limits the forwardmost position of said pick-up bar, defining a normal operating position of the apparatus. The apparatus is arranged and constructed so that gravitational forces acting on the pick-up bar will always urge the pick-up bar toward the forwardmost position. The pick-up bar includes a smooth lower surface defining a runner for traveling in close proximity to the ground.

30 Claims, 4 Drawing Figures

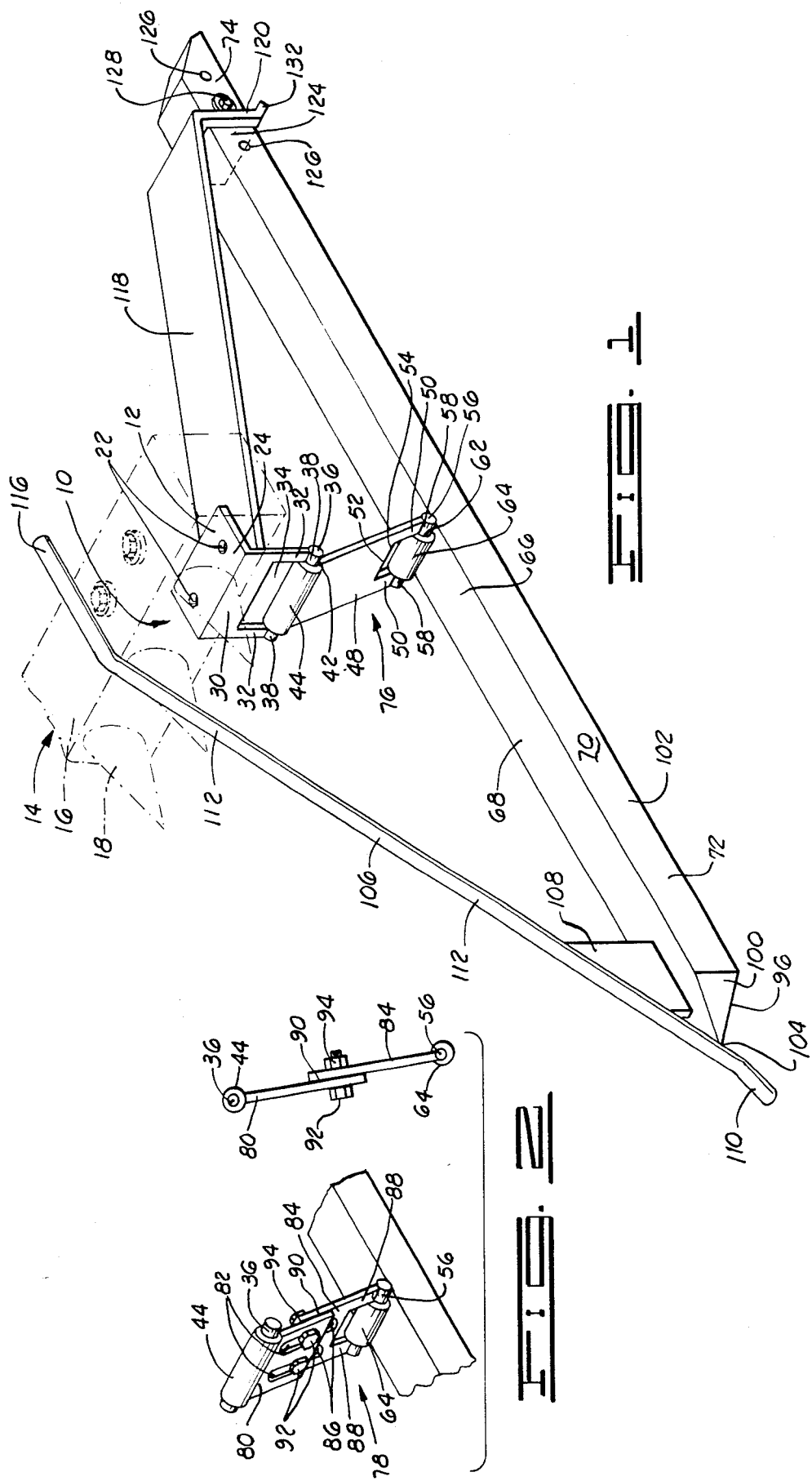

APPARATUS FOR LIFTING CROPS

BACKGROUND AND BRIEF DESCRIPTION OF THE INVENTION

This invention relates to apparatus for lifting crops ahead of a farm crop harvesting machine, and more particularly to an improved means for attaching such apparatus to said machine.

The apparatus of the invention includes a mounting bracket for attaching to the farm machine, and a pick-up bar to which is attached a grain lifting tool, or the like. A linkage means, having an upper end pivotally connected to said mounting bracket and a lower end pivotally connected to said pick-up bar, allows said pick-up bar to swing rearward relative to said mounting bracket. A preferred embodiment of said linkage means includes a solid link pivoted at each end. An alternate embodiment provides that the linkage means be adjustable in length.

The rear portion of the pick-up bar is slidably disposed through a guide opening in a guide frame, said guide frame being rigidly attached to the mounting bracket. Limiting means are provided on the pick-up bar which limit a forwardmost position of said pick-up bar relative to said mounting bracket. The limiting means can be made adjustable so that the pick-up bar remains substantially horizontal when in said forwardmost position for all lengths of said linkage means.

The crop lifting apparatus of the present invention is attached to a forward end of the farm machine. Traveling in close proximity to a ground surface, the apparatus slides under the stalks of the crop forcing the stalks up and back into the cutting teeth on the machine. Such tools are more particularly used when said crops have been flattened against the ground by rain, hail, wind or the like; in such instances, the crops must be raised up to the cutting teeth of the machine for harvesting.

A problem arises with crop lifting apparatus when they encounter obstacles along the surface of the ground. A rigidly attached apparatus will twist to one side and may twist downward or upward as well, resulting in damage to the apparatus which frequently requires immediate repair or replacement. Prior crop lifting apparatus have tried to solve this problem by providing a single pivoting means such that the front of the tool will swing upward from the obstruction, as disclosed in U.S. Pat. Nos. 2,734,332 to Fisher, 2,960,814 to Babcock, 4,022,000 to Coxbill and 3,821,877 to Weinheimer. However, such pivoting means may not prevent the tool from being twisted to one side or downward.

The present invention offers an improvement over the prior art in that the pick-up bar will swing rearward when the forward end of said pick-up bar encounters an obstacle on the ground, and the guide frame, pick-up bar and linkage means are so arranged and constructed that as said pick-up bar swings rearward from said forwardmost position, the front end of said pick-up bar is lifted, thus raising said front end above the obstruction. This rearward and upward motion of the front end of the pick-up bar eliminates the tendency to twist up, down or to one side as with previous crop lifting tools.

U.S. Pat. No. 3,821,877 to Weinheimer discloses, at FIGS. 10-13, a crop lifting apparatus in which the forward end of the tool is raised as a rear end portion slides rearward against a rearwardly and downwardly sloping fixed wedge surface. A mechanical spring is required to return the tool to its forwardmost position. To move the tool, a force must be applied which is sufficient to overcome the frictional forces from the various sliding surfaces, the initial spring loading and the increasing spring loading as the tool is moved and the spring deflected.

With the apparatus of the present invention, on the other hand, a gravity return means, rather than mechanical means such as a spring, returns the pick-up bar of the present invention to its original forwardmost position after the tool has passed over the obstacle. Said gravity return means is provided by said mounting bracket, pick-up bar and linkage means being so arranged and constructed that when said pick-up bar is in its forwardmost position relative to said mounting bracket, said linkage means is no further forward than a vertical position thereof, so that gravitational forces acting on said pick-up bar always urge said pick-up bar towards said forwardmost position, said forwardmost position being a normal operating position of said pick-up bar.

In the apparatus of the present invention, a runner means is defined by a smooth lower surface of the pick-up bar for traveling in close proximity to the ground. A lower portion of the guide bracket is the only part of the apparatus which extends below said runner means, and said lower portion of said guide bracket extends rearward to minimize interference with the ground. All other moving parts are above said runner means. Thus, the present invention is further distinguished from the prior art, and particularly from Weinheimer which has various items including the return spring protruding below the tool. Weinheimer requires the use of a shoe means to raise said protrusions and spring to prevent them from being dragged along the ground, but said protrusions and spring still are likely to become obstructed by dirt, grain stalks or the like, thereby adversely affecting the performance of the tool.

From the foregoing description of the present invention, it will be apparent that an important object of the invention is to provide an improved crop lifting apparatus in which a pick-up bar of said apparatus will swing rearward on a linkage means when said apparatus encounters an obstruction on the ground.

A further object of the invention is to provide an improved crop lifting apparatus in which the front end of the pick-up bar of said apparatus is raised as said pick-up bar swings rearward.

A further object of the invention is to provide a limiting means to define a forwardmost position of said pick-up bar.

A further object of the invention is to provide an improved arrangement and construction of said apparatus whereby a gravity return means will return said pick-up bar to said forwardmost position.

A further object of the invention is to provide an improved runner means for traveling in close proximity to a ground sur- face.

Additional objects and advantages of the invention will become apparent from the following detailed description of a preferred embodiment of the invention when the same is read in conjunction with the accompanying drawings which illustrate such embodiment.

GENERAL DESCRIPTION OF THE DRAWINGS

FIG. 1 is an isometric view of an apparatus for lifting crops constructed in accordance with the present invention.

FIG. 2 is a detail illustrating a linkage means which is adjustable in length.

DETAILED DESCRIPTION OF A PREFERRED EMBODIMENT OF THE INVENTION

Figure 3:
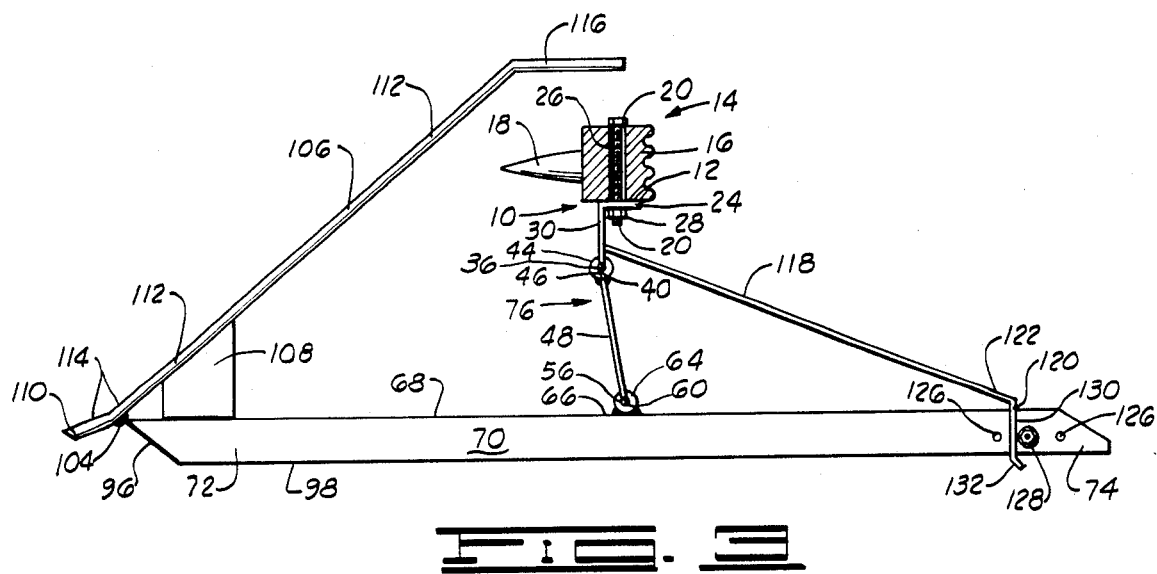
FIG. 3 is an elevation view which illustrates the invention in its forwardmost operating position.

Referring initially to the drawings, and more particularly FIGS. 1 and 3, the apparatus of the invention for lifting crops includes a mounting bracket 10 attached at surface 12 to a farm crop harvesting machine portion 14 such as, but not limited to, a frame 16 adjacent a series of cutting teeth 18 of a harvester, details of said machines being commonly known in the prior art such as shown for example in U.S. Pat. No. 3,821,877 to Weinheimer. The frame portion 16 illustrated is often referred to by those skilled in the art as a cutter bar. Mounting bracket 10 is attached to harvester frame 16 by means of a pair of bolts 20 passing through holes 22 in a flange 24 and through holes 26 in harvester frame 16, each of said bolts 20 being secured by a nut 28.

A substantially vertical member 30 forming a portion of mounting bracket 10 projects downward from flange 24. Two fingers 32 project further downwardly from vertical member 30 such that a gap 34 is formed between said fingers. A pivot pin 36 extends across gap 34, said pivot pin having two end portions 38 each of which portions is fixedly attached, as by welding or the like, to a lower edge 40 of a finger 32.

Pivot pin 36 passes through a central opening 42 of a pivot sleeve 44, said pivot sleeve being thereby located between fingers 32. The outside diameter of pivot pin 36 and the inside diameter of central opening 42 of pivot sleeve 44 are dimensioned such that said pivot sleeve can rotate freely outside said pivot pin.

Pivot sleeve 44 is fixedly attached, as by welding or the like, to an upper edge 46 of a link 48. Two fingers 50 project downwardly from a lower end 52 of the link 48 such that a gap 54 is formed between said fingers. A pivot pin 56 extends across gap 54, said pivot pin having two end portions 58 each of which is fixedly attached, as by welding or the like, to a lower edge 60 of a finger 50.

Pivot pin 56 passes through a central opening 62 of a pivot sleeve 64, said pivot sleeve being thereby located between fingers 50. The outside diameter of pivot pin 56 and the inside diameter of central opening 62 of pivot sleeve 64 are dimensioned such that said pivot sleeve and pivot pin can rotate freely in relationship to one another.

Pivot sleeve 64 is fixedly attached, as by welding or the like, to an intermediate portion 66 of an upper surface 68 of a rectilinear pick-up bar 70, said pick-up bar also having a front end portion 72 and a rear end portion 74.

Thus, pivot pin 36, pivot sleeve 44, link 48, pivot pin 56 and pivot sleeve 64 generally form an embodiment of a linkage means 76 connecting said pick-up bar 70 to said mounting bracket 10 which allows said pick-up bar to swing rearwardly relative to said mounting bracket.

Referring now to FIG. 2, an alternate embodiment is shown which has a linkage means 78 adjustable in length. In this alternate construction, pivot sleeve 44 is fixedly attached to an upper link 80 having two parallel slots 82 therethrough. A lower link 84, having two parallel slots 86 therethrough, also has two downwardly projecting fingers 88 which are fixedly attached to pivot pin 56. Upper link 80 is in slidable parallel contact with lower link 84 along surface 90, and each slot 82 in said upper link is in alignment with a slot 86 in said lower link such that a bolt 92 can pass through each slot 82 and then through a corresponding slot 86. After sliding upper link 80 on lower link 84 along surface 90 to reach the desired distance between pivot sleeve 44 and pivot pin 56, the adjustable linkage means is secured by tightening a nut 94 on each bolt 92.

Other embodiments are within the scope of the invention. For example, and not by way of limitation, said linkage means may include a flexible link (not shown) wherein the pivoted connection between the linkage and each of the mounting bracket 10 and the pick-up bar 70 is provided by the flexibility of the link itself at its ends where it is connected to mounting bracket 10 and pick-up bar 70.

Referring again to FIGS. 1 and 3, at the forward end portion 72 of pick-up bar 70, a surface 96 angles upward from a bottom surface 98 of the pick-up bar. A surface 100 angles inwardly from each of two vertical sides 102 of pick-up bar 70, such that angled surface 96, both angled surfaces 100 and horizontal upper surface 68 all intersect at a substantially singular point 104. An upwardly and rearwardly extending lifting tool 106 is attached to the pick-up bar 70 at point 104, such as by welding. Providing support and further connection between the lifting tool and pick-up bar is a vertical strut 108. A front portion 110 of lifting tool 106 extends forward from point 104 and from a major intermediate portion 112 of the lifting tool, said front portion 110 also extending slightly downwardly, such that an obtuse angle is formed between said front portion and said major intermediate portion along an upper surface 114. A rear portion 116 of lifting tool 106 extends rearwardly and substantially horizontally from the major intermediate portion 112.

A guide frame 118 is rigidly attached to and extends rearwardly from the leg 30 of mounting bracket 10, said guide frame having a downwardly directed leg 120 at a rear end 122 thereof. Leg 120 has a guide opening 124 disposed therethrough, and the rear portion 74 of the pick-up bar 70 is slidably disposed through said guide opening. A series of holes 126 are disposed horizontally through said rear portion 74, each of said holes opening into both of said vertical sides 102 of said pick-up bar 70 and being substantially perpendicular thereto. A bolt 128 is passed through one of said holes rearward of the downward leg 120 of guide frame 118 such that a head of said bolt shoulders against one vertical side 102; a nut (not shown) secures said bolt 128 and shoulders against the opposite vertical side 102.

A forwardmost position of pick-up bar 70 relative to mounting bracket 10 is defined by a limiting means provided when said bolt and nut abut a rear surface 130 of downward leg 120 of guide frame 118, said limiting means being adjustable by passing the bolt through a preselected hole 126 so that pick-up bar 70 remains substantially horizontal when in said forwardmost position for all lengths of linkage means 76. This adjustable limiting means is of particular use when alternate adjustable linkage means 78 is employed in the invention. The forwardmost position of pick-up bar 70 is preferably further adjusted so that pivot pin 56 and pivot sleeve 64, at the lower end of linkage means 76 or adjustable linkage means 78, are rearward of a vertical or bottom dead center position of either of said linkage means, as best shown in FIG. 3.

It will be understood that the linkage means 76 or 78 does not have to be a straight linkage. It could be curved or of any shape. The "vertical" position of a straight linkage such as 76 or 78 is, of course, a position where the linkage is oriented straight up and down, i.e., vertical. The "vertical" position of a curved or other shape linkage would be a position where, in the absence of anything limiting the position of the linkage, the pivotal connection between the lower end of the linkage means and the pick-up bar is at the lowest possible point relative to frame 16.

It should be noted that guide frame 118 does not have to be constructed from a separate piece of material welded to mounting bracket 10. For example, flange 24 and vertical member 30 of mounting bracket 10, and the guide frame 118 could be formed by bending a single piece of metal strap, so that guide frame 118 extends rearward from the rear edge of flange 24.

The bottom surface 98 of pick-up bar 70 is smooth and acts as a runner means for traveling in close proximity to a ground surface. A lower portion 132 of downward leg 120 which extends below surface 98 also extends rearward from said leg to minimize interference with said ground surface when traveling in close proximity thereto.

The principles of the present invention can also be embodied in the attachment of other types of farm implements, other than pick-up bars, to other types of farm machines, other than har- vesters.

OPERATION OF THE INVENTION

As will be understood by those skilled in the art, a plurality of pick-up bars are attached to the harvester frame 16, and are preferably spaced about one foot apart.

As the farm machine moves forward along a field of crops, the forwardmost position of each pick-up bar 70, as best shown in FIG. 3, defines a normal operating position of the invention. The runner means formed by the lower surface 98 of the pick-up bar travels in close proximity to the ground surface, and the forward portion 110 of the lifting tool 106 moves under the stalks of the crop. As the apparatus is moved forward, said crop stalks are forced up along the major intermediate portion 112 of lifting tool 106 and thus fed into the cutting teeth 18.

Figure 4:
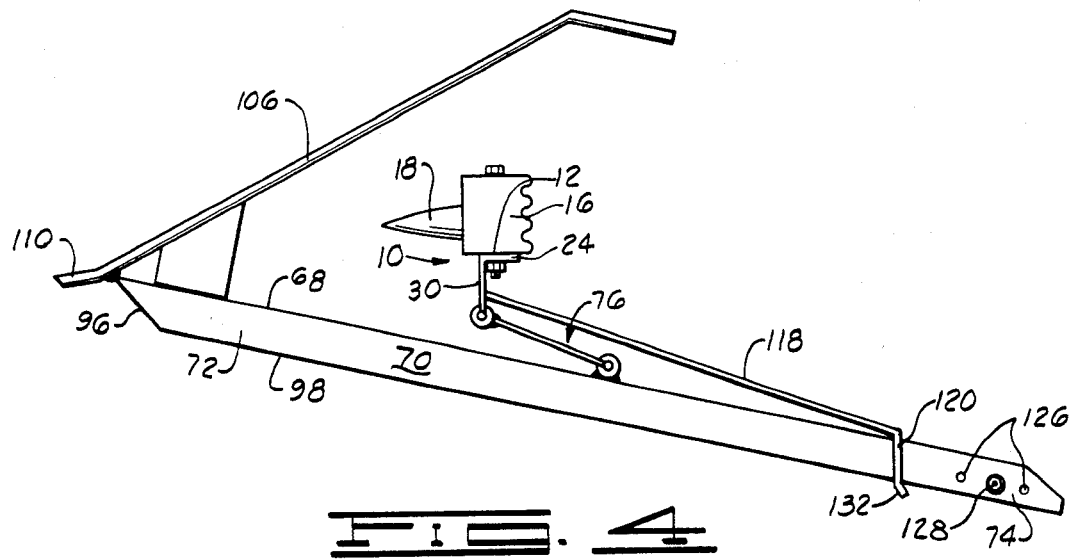
FIG. 4 is an elevation view which illustrates the invention in a rearward and upward position.

If forward portion 110 strikes an obstruction along the ground, the pick-up bar will be forced to move rearward from the forwardmost position relative to mounting bracket 10, swinging on linkage means 76 or alternate adjustable linkage means 78. The guide frame 118, pick-up bar 70 and linkage means 76 or 78 are so arranged and constructed that as said pick-up bar swings rearward from said forwardmost position, the front end 72 of said pick-up bar is lifted, thus raising said front end above said obstruction. A raised position of the pick-up bar is illustrated in FIG. 4, in which the rearward and upward movement of the forward portion 72 of pick-up bar 70 is clearly shown. It will be readily apparent to those skilled in the art that the maximum rearward and upward position occurs when linkage 76 or 78 is substantially parallel to upper surface 68 of pick-up bar 70.

After the apparatus passes over the obstruction, gravity return means returns the pick-up bar to the normal operating position. Said gravity return means is provided by said mounting bracket, pick-up bar and linkage means being so arranged and constructed that when said pick-up bar is in a forwardmost position relative to said mounting bracket, said linkage means is no further forward than a vertical position thereof, so that gravitational forces acting on said pick-up bar always urge said pick-up bar toward said forwardmost position. Also, the weight of the grain stalks being lifted by the lifting means 106 will aid in this return motion.

Although a preferred embodiment of the invention has been herein described in order to illustrate the basic principles which underlie the invention, it will be understood that various changes of structure can be made in the apparatus without departure from such basic principles or alteration of the general mode of operation. Changes and alterations of this type are therefore deemed to be circumscribed by the spirit and scope of the invention except as the same may be necessarily limited by the appended claims, or reasonable equivalents thereof.

What is claimed is:

1. An apparatus for lifting crops ahead of a crop harvesting machine, comprising:
    a mounting bracket;
    a pick-up bar; and
    a linkage means, having an upper end pivotally connected to said mounting bracket and a lower end pivotally connected to said pick-up bar, for allowing said pick-up bar to swing rearwardly relative to said mounting bracket.

2. The apparatus of claim 1, wherein:
    said linkage means is a rigid linkage means.

3. The apparatus of claim 1, further comprising:
    guide means. operatively associated with said pick-up bar, for lifting a front end of said pick-up bar upwards as said pick-up bar swings rearwardly relative to said mounting bracket.

4. The apparatus of claim 3, wherein:
    said guide means includes a guide frame fixed relative to said mounting bracket, said guide frame having a guide opening disposed therein through which a rear portion of said pick-up bar is slidably disposed.

5. The apparatus of claim 4, wherein:
    said guide frame is rigidly attached to said mounting bracket.

6. The apparatus of claim 4, further comprising:
    limit means, operatively associated with said pick-up bar, for limiting forward movement of said pick-up bar relative to said mounting bracket.

7. The apparatus of claim 6, wherein:
    said limit means includes an abutment means, attached to a portion of said pick-up bar rearward of said guide opening of said guide frame, for abutting said guide frame to define a forwardmost position of said pick-up bar relative to said mounting bracket.

8. The apparatus of claim 6, wherein:
    said limit means defines a forwardmost operating position of said pick-up bar relative to said mounting bracket, said linkage means being rearward of a vertical position when said pick-up bar is in said forwardmost position.

9. The apparatus of claim 1, further comprising:
    limit means, operatively associated with said pick-up bar, for limiting forward movement of said pick-up bar relative to said mounting bracket.

10. The apparatus of claim 9, wherein:

said limit means defines a forwardmost operating position of said pick-up bar relative to said mounting bracket, said linkage means being rearward of a vertical position when said pick-up bar is in said forwardmost position.

11. The apparatus of claim 9, wherein:
said linkage means is adjustable in length; and
said limit means is adjustable so that said pick-up bar remains substantially horizontal when in a forwardmost operating position relative to said mounting bracket, for all lengths of said linkage means.

12. The apparatus of claim 1, wherein:
said pick-up bar includes a lifting means, extending upwardly and rearwardly from a front end thereof, for lifting said crops as said pick-up bar is moved forward relative to said crops.

13. The apparatus of claim 1, wherein:
a bottom surface of said pick-up bar defines a runner means traveling in proximity to a ground surface; and
said lower end of said linkage means is attached to said pick-up bar above said runner means.

14. The apparatus of claim 1, further comprising:
gravity return means for returning said pick-up bar to an operating position thereof.

15. The apparatus of claim 14, wherein:
said gravity return means is provided by said mounting bracket, pick-up bar, and linkage means being so arranged and constructed that when said pick-up bar is in a forwardmost position relative to said mounting bracket, said linkage means is no further forward than a vertical position thereof, so that gravitational forces acting on said pick-up bar always urge said pick-up bar towards said forwardmost position, said forwardmost position being said operating position of said pick-up bar.

16. An apparatus for lifting crops ahead of a crop harvesting machine, comprising:
a mounting bracket;
a guide frame rigidly attached to and extending rearwardly from said mounting bracket, said guide frame having a downwardly directed leg at a rear end thereof and having a guide opening disposed through said downwardly directed leg;
a pick-up bar, having a lifting means extending upwardly and rearwardly from a front end thereof, and having a rear portion slidably disposed through said guide opening;
a linkage means, having an upper end pivotally connected to said mounting bracket and having a lower end pivotally connected to an intermediate portion of said pick-up bar, for allowing said pick-up bar to swing rearwardly relative to said mounting bracket;
limit means, operatively associated with said pick-up bar, for limiting forward movement of said pick-up bar relative to said mounting bracket; and
wherein said mounting bracket, guide frame, pick-up bar, linkage means, and limit means are so arranged and constructed that as said pick-up bar swings rearward from a forwardmost position thereof relative to said mounting bracket, said front end of said pick-up bar is lifted.

17. The apparatus of claim 16, wherein:
said linkage means is a rigid linkage means.

18. The apparatus of claim 16, wherein:
said limit means includes an abutment means, attached to a portion of said pick-up bar rearward of said guide opening of said guide frame, for abutting said guide frame to define said forwardmost portion of said pick-up bar relative to said mounting bracket.

19. The apparatus of claim 16, wherein:
said linkage means is rearward of a vertical position thereof when said pick-up bar is in said forwardmost position.

20. The apparatus of claim 16, wherein:
said linkage means is adjustable in length; and
said limit means is adjustable so that said pick-up bar remains substantially horizontal when in said forwardmost position relative to said mounting bracket, for all lengths of said linkage means.

21. The apparatus of claim 16, wherein:
a bottom surface of said pick-up bar defines a runner means traveling in proximity to a ground surface; and
said lower end of said linkage means is attached to said pick-up bar above said runner means.

22. The apparatus of claim 16, further comprising:
gravity return means for returning said pick-up bar to said forwardmost position thereof.

23. The apparatus of claim 22, wherein:
said gravity return means is provided by said mounting bracket, pick-up bar, and linkage means being so arranged and constructed that when said pick-up bar is in said forwardmost position relative to said mounting bracket, said linkage means is no further forward than a vertical position thereof, so that gravitational forces acting on said pick-up bar always urge said pick-up bar towards said forwardmost position.

24. An apparatus, comprising:
a farm machine;
a farm implement;
a linkage having an upper end pivotally connected to said farm machine and a lower end pivotally connected to said implement; and
said farm machine, farm implement, and linkage being so arranged and constructed that said implement may swing rearwardly relative to said machine to prevent damage to said implement and said machine when said implement engages an obstacle as said machine is moved across a ground surface.

25. The apparatus of claim 24, wherein:
said linkage is a rigid linkage.

26. The apparatus of claim 24, further comprising:
guide means, operatively associated with said implement, for lifting a front end of said implement as said implement swings rearwardly relative to said farm machine.

27. The apparatus of claim 24, further comprising:
limit means, operatively associated with said implement, for limiting forward movement of said implement relative to said farm machine and thus defining an operating position of said implement.

28. The apparatus of claim 27, wherein:
said linkage is no further forward than a vertical position thereof relative to said farm machine when said implement is in its said operating position.

29. The apparatus of claim 24, further comprising:
gravity return means for returning said implement to an operating position thereof relative to said farm machine.

30. The apparatus of claim 29, wherein:

said gravity return means is provided by said farm machine, said farm implement, and said linkage being so arranged and constructed that when said implement is in said operating position, said linkage is no further forward than a vertical position thereof, so that gravitational forces acting on said implement always urge said implement toward said operating position.

* * * * *